(12) United States Patent
Okada (10) Patent No.: US 9,091,958 B2
(45) Date of Patent: Jul. 28, 2015

(54) LIGHT SCANNING APPARATUS WITH REDUCED THERMAL STRESS

(71) Applicant: CANON KABUSHIKI KAISHA, Tokyo (JP)

(72) Inventor: Yuta Okada, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/715,165

(22) Filed: Dec. 14, 2012

(65) Prior Publication Data

US 2013/0162745 A1 Jun. 27, 2013

(30) Foreign Application Priority Data

Dec. 26, 2011 (JP) ................................ 2011-282608

(51) Int. Cl.
| | |
|---|---|
| *B41J 15/14* | (2006.01) |
| *B41J 27/00* | (2006.01) |
| *G03G 15/043* | (2006.01) |
| *G02B 26/10* | (2006.01) |
| *G02B 26/12* | (2006.01) |

(52) U.S. Cl.
CPC .......... *G03G 15/0435* (2013.01); *G02B 26/105* (2013.01); *G02B 26/121* (2013.01)

(58) Field of Classification Search
CPC ............ B41J 19/04; B41J 19/12; B41J 29/04; B41J 29/06
USPC ......... 347/231, 242, 243, 245, 257, 259–261, 347/263
See application file for complete search history.

(56) References Cited

U.S. PATENT DOCUMENTS

| | | | |
|---|---|---|---|
| 6,580,186 B1 * | 6/2003 | Suzuki et al. | 310/51 |
| 7,471,433 B2 * | 12/2008 | Shima et al. | 359/200.1 |
| 8,830,289 B2 | 9/2014 | Iwai | 347/261 |
| 2006/0061865 A1 | 3/2006 | Shima et al. | |

(Continued)

FOREIGN PATENT DOCUMENTS

| | | |
|---|---|---|
| CN | 101105655 | 1/2008 |
| EP | 525709 A1 | 2/1993 |
| JP | 10-206776 A | 8/1998 |

(Continued)

OTHER PUBLICATIONS

Search Report, Apr. 18, 2013. Intellectual Property Office, Great Britain, Patent Application No. GB1222872.2.

(Continued)

*Primary Examiner* — Hai C Pham
(74) *Attorney, Agent, or Firm* — Fitzpatrick, Cella, Harper & Scinto (57) ABSTRACT

A light scanning apparatus, including: a light source configured to emit a light beam; a light deflector including: a rotary shaft; a bearing portion configured to support the rotary shaft; a rotor fixed to the rotary shaft; a stator fixed to the bearing portion; a drive circuit board configured to support the bearing portion and to drive the stator to rotate the rotor; and a mirror portion fixed to the rotor, the light deflector being configured to deflect the light beam emitted from the light source by the mirror portion; and a housing including: a bearing inserting portion into which the bearing portion is inserted; a fixing portion configured to fix the drive circuit board; and a recessed portion provided between the bearing inserting portion and the fixing portion.

17 Claims, 5 Drawing Sheets

(56) References Cited

U.S. PATENT DOCUMENTS

| | | | |
|---|---|---|---|
| 2006/0208179 A1 | 9/2006 | Itami | 250/234 |
| 2008/0013142 A1 | 1/2008 | Tahk | 359/216 |

FOREIGN PATENT DOCUMENTS

| JP | 11-160644 | | 6/1999 | |
|---|---|---|---|---|
| JP | 2000-298243 | | 10/2000 | |
| JP | 2000-298243 A | | 10/2000 | |
| JP | 2000298243 A | * | 10/2000 | ............. G02B 26/10 |
| JP | 2004-333844 | | 11/2004 | |
| JP | 2005-031160 | | 2/2005 | |
| JP | 2006-010814 | | 1/2006 | |
| JP | 2006010814 A | * | 1/2006 | ................. B41J 2/44 |
| JP | 2006201441 A | * | 8/2006 | ............. G02B 26/10 |
| JP | 2008-107460 A | | 5/2008 | |
| JP | 2009-198890 | | 9/2009 | |

OTHER PUBLICATIONS

Chinese Office Action dated Sep. 26, 2014, in counterpart Chinese Patent Application No. 201210559956.6, and English translation.
Great Britain Search Examination dated Feb. 25, 2015 in counterpart Great Britain patent Application No. 1222872.2.

* cited by examiner

LIGHT SCANNING APPARATUS WITH REDUCED THERMAL STRESS

BACKGROUND OF THE INVENTION

1. Field of the Invention

The present invention relates to a light scanning apparatus which irradiates an image bearing member with a light beam in an image forming apparatus.

2. Description of the Related Art

In a conventional electrophotographic image forming apparatus such as a copying machine and a printer, a light scanning apparatus irradiates a surface of an image bearing member with a light beam to form an electrostatic latent image on the image bearing member. The electrostatic latent image thus formed is developed into a toner image with developer (toner), and the toner image is transferred onto a recording medium. In this manner, an image is formed.

The light scanning apparatus provided in the conventional electrophotographic image forming apparatus includes a light source configured to emit a light beam based on image information, and a light deflector configured to deflect the light beam for scanning. Further, the light scanning apparatus includes an fθ lens configured to scan, at constant speed, the light beam which is deflected by the light deflector, and to image the light beam on the image bearing member, a mirror configured to reflect the light beam in a predetermined direction, and a housing configured to hold those optical members.

The image forming apparatus disclosed in Japanese Patent Application Laid-Open No. 2000-298243 is intended to reduce noise or the like generated by excitation sound of a motor of the light deflector inside the light scanning apparatus. Therefore, Japanese Patent Application Laid-Open No. 2000-298243 discloses a configuration in which an opposing wall surface which reflects excitation sound is provided so that a difference between a direct propagation distance of the excitation sound from an outer circumferential portion of a stator coil to a cover member of the housing and a reflective propagation distance from the outer circumferential portion of the stator coil to the cover member via the opposing wall surface becomes a half wavelength of the excitation sound. Further, Japanese Patent Application Laid-Open No. 2000-298243 discloses a configuration in which a recessed portion is provided as the opposing wall surface in a bottom plate of the housing. In the light scanning apparatus of the image forming apparatus disclosed in Japanese Patent Application Laid-Open No. 2000-298243, in order to prevent an obstacle from being located between the light deflector and the opposing wall surface, the outer circumferential portion of the stator coil is arranged outside a region immediately above a motor drive circuit board. That is, the recessed portion as the opposing wall surface is arranged outside a region immediately below the motor drive circuit board.

The light deflector rotates to generate heat, and the heat thus generated is transferred to the housing of the light scanning apparatus. However, the conventional technology as disclosed in Japanese Patent Application Laid-Open No. 2000-298243 does not take into consideration a thermal stress generated in the housing and the motor drive circuit board (drive circuit board) of the light deflector mounted on the housing, due to a difference in coefficient of linear expansion of materials forming the housing and the motor drive circuit board, caused by the generated heat. This thermal stress causes thermal deformation in the housing and the motor drive circuit board, and as a result, the postures of the optical members such as the light deflector, lenses, and mirrors held in the housing become unstable. Such instability causes increase in spot diameter of the light beam on the surface of the image bearing member and shift of an irradiation position of the light beam. As a result, color misregistration occurs in the image formed on the sheet, leading to image degradation.

The light deflector is positioned with respect to the housing by fitting a bearing portion of the light deflector into a bearing holding portion of the housing. The light deflector is mounted on the housing by a fixing portion provided in the bottom plate of the housing. The heat generation source of the light deflector is the bearing portion which supports a rotary shaft of the motor. The heat generated in the bearing portion of the light deflector is transferred along a path from the bearing portion to the bearing holding portion of the housing, in turn from the bearing holding portion to the bottom plate of the housing, and in turn from the bottom plate to the fixing portion. Such heat transfer causes thermal deformation in the housing. On the other hand, the bearing portion is further supported by the drive circuit board of the light deflector, and the drive circuit board is fixed to the fixing portion of the housing. The heat generated in the bearing portion is transferred also to the drive circuit board. Such heat transfer causes thermal deformation in the drive circuit board. In general, the housing and the drive circuit board are made of different materials, and hence the thermal deformation amount of the housing and the thermal deformation amount of the drive circuit board are different from each other due to the difference in coefficient of linear expansion between the housing and the drive circuit board. Due to the difference in thermal deformation amount, the thermal stress is generated in the housing and the drive circuit board. Therefore, it is necessary to suppress the thermal stress between the bearing holding portion and the fixing portion.

SUMMARY OF THE INVENTION

In view of the above, the present invention provides a light scanning apparatus configured to stabilize the postures of a light deflector and optical members by suppressing a thermal stress generated in a housing and a motor drive circuit board, and provides an image forming apparatus including the light scanning apparatus.

According to an exemplary embodiment of the present invention, there is provided a light scanning apparatus, including: a light source configured to emit a light beam; a light deflector including: a rotary shaft; a bearing portion configured to support the rotary shaft; a rotor fixed to the rotary shaft; a stator fixed to the bearing portion; a drive circuit board configured to support the bearing portion and to drive the stator to rotate the rotor; and a mirror portion fixed to the rotor, the light deflector being configured to deflect the light beam emitted from the light source by the mirror portion; and a housing including: a bearing inserting portion into which the bearing portion is inserted; a fixing portion configured to fix the drive circuit board; and a recessed portion provided between the bearing inserting portion and the fixing portion.

Further features of the present invention will become apparent from the following description of exemplary embodiments with reference to the attached drawings.

DESCRIPTION OF THE EMBODIMENT

Figure 1:
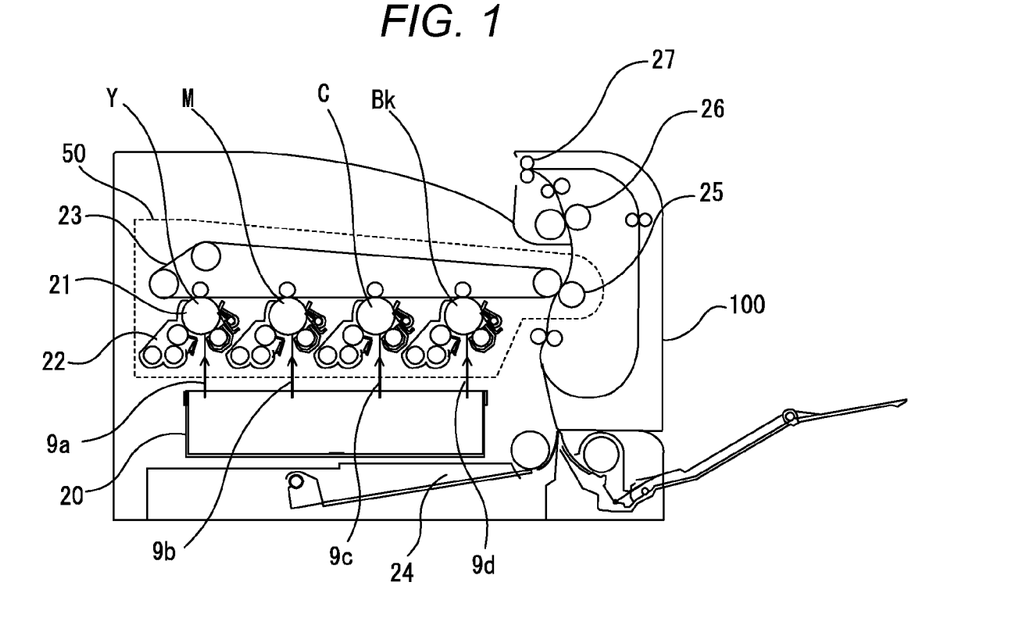
FIG. 1 is a schematic front sectional view of an image forming apparatus on which a light scanning apparatus according to an embodiment of the present invention is mounted.

FIG. 1 is a schematic front sectional view of an image forming apparatus 100 on which a light scanning apparatus 20 according to an embodiment of the present invention is mounted. The image forming apparatus 100 according to the embodiment is configured to output a full-color image.

An image forming portion 50 of the image forming apparatus 100 according to the embodiment includes four sets of photosensitive members (hereinafter referred to as "image bearing members") 21 and developing devices 22 corresponding to yellow (Y), magenta (M), cyan (C), and black (Bk), respectively, an intermediate transfer belt 23, and a transfer portion 25. As illustrated in FIG. 1, the image forming apparatus 100 according to the embodiment employs an exposure system in which the light scanning apparatus 20 provided below the image forming portion 50 irradiates the image bearing members 21 of the image forming portion 50 with light beams 9 (9a, 9b, 9c, and 9d) based on image information. That is, the image forming apparatus 100 according to the embodiment is configured so that the single light scanning apparatus 20 exposes the four image bearing members 21 to light beams.

The light beams 9 from the light scanning apparatus 20 irradiate the surfaces of the image bearing members 21 to form latent images on the image bearing members 21, respectively. The internal configuration of the light scanning apparatus 20 is described in detail later. Toner supplied from the developing devices 22 adheres to the latent images thus formed, and the latent images on the image bearing members 21 are developed into toner images. The toner images are transferred onto the intermediate transfer belt 23, and then transferred at the transfer portion 25 onto a sheet conveyed from a sheet cassette 24. When outputting a full-color image, the images of the respective colors are superimposed on top of one another on the intermediate transfer belt 23 by the four image bearing members 21. The sheet having the toner images transferred thereto is fixed by a fixing device 26, and is delivered outside the apparatus via delivery rollers 27.

Figure 2A:
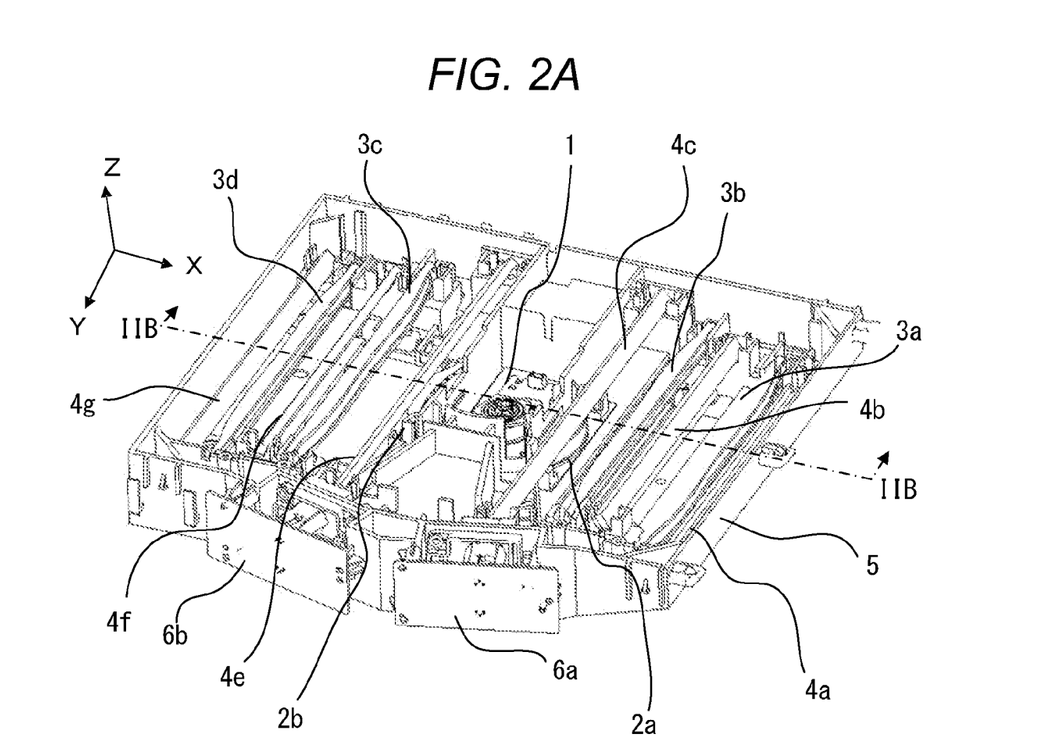
FIG. 2A is a perspective view of the light scanning apparatus without a cover.
Figure 2B:
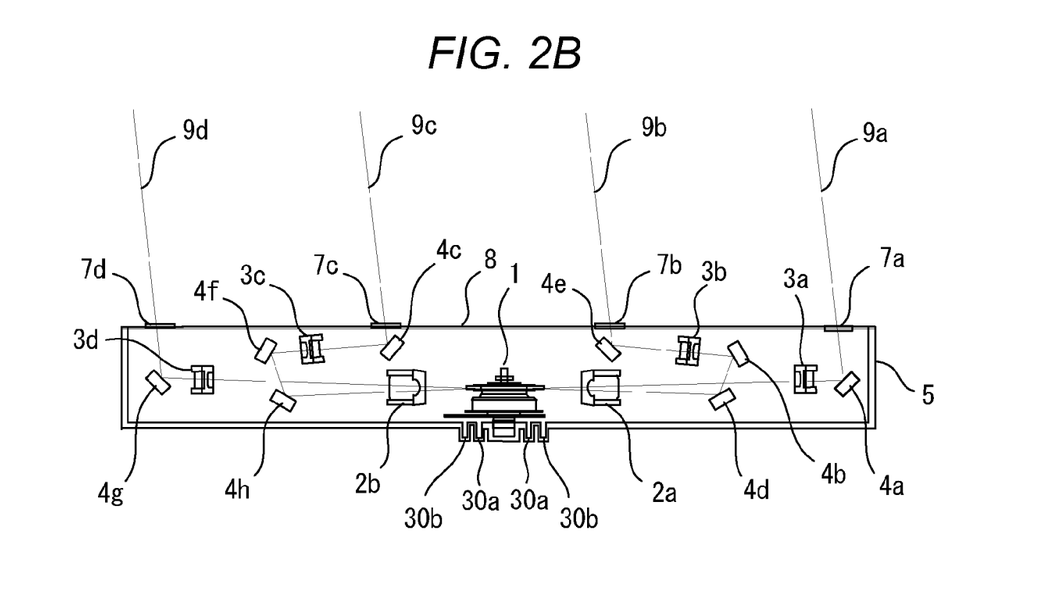
FIG. 2B is a sectional view taken along the line IIB-IIB of FIG. 2A, for illustrating the light scanning apparatus with the cover.

FIG. 2A is a view of the entire light scanning apparatus 20 according to the embodiment. FIG. 2B is a sectional view taken along the line IIB-IIB of FIG. 2A.

Each of the light beams (laser beams) 9 output from light sources 6a and 6b is guided to a light deflector 1 through a collimator lens and a cylindrical lens.

The light deflector 1 configured to deflect the light beams for scanning is arranged substantially at the center portion of a housing 5. At positions opposed to each other across the light deflector 1, first lenses 2a and 2b and second lenses 3a, 3b, 3c, and 3d are arranged as optical members configured to image the light beams on the image bearing members 21 and to scan the light beams at constant speed.

The light beams 9a, 9b, 9c, and 9d expose the image bearing members 21 for yellow, magenta, cyan, and black, respectively. The first lens 2a is arranged on optical paths of the light beams 9a and 9b, and the first lens 2b is arranged on optical paths of the light beams 9c and 9d. Further, the second lenses 3a, 3b, 3c, and 3d are arranged on the optical paths of the light beams 9a, 9b, 9c, and 9d, respectively. Further, mirrors 4a, 4b, 4c, 4d, 4e, 4f, 4g, and 4h as optical members configured to guide the light beams 9a, 9b, 9c, and 9d deflected for scanning to the respective image bearing members 21 are arranged on the respective optical paths.

The mirrors and the lenses as the optical members are fixed to the housing 5.

The housing 5 is formed by injection molding through use of, for example, a material reinforced with glass fibers mixed into a synthetic resin of polyphenyl ether and polystyrene.

The light beams 9a, 9b, 9c, and 9d passing through the respective lenses and mirrors are guided to the corresponding image bearing members 21 through dust-proof glass plates 7a, 7b, 7c, and 7d provided on a cover 8. For description of the internal components, FIG. 2A omits the cover 8 which covers the top of the housing 5 for dust proofing.

FIG. 2B illustrates recessed portions 30a and 30b, which are described later.

Figure 3:
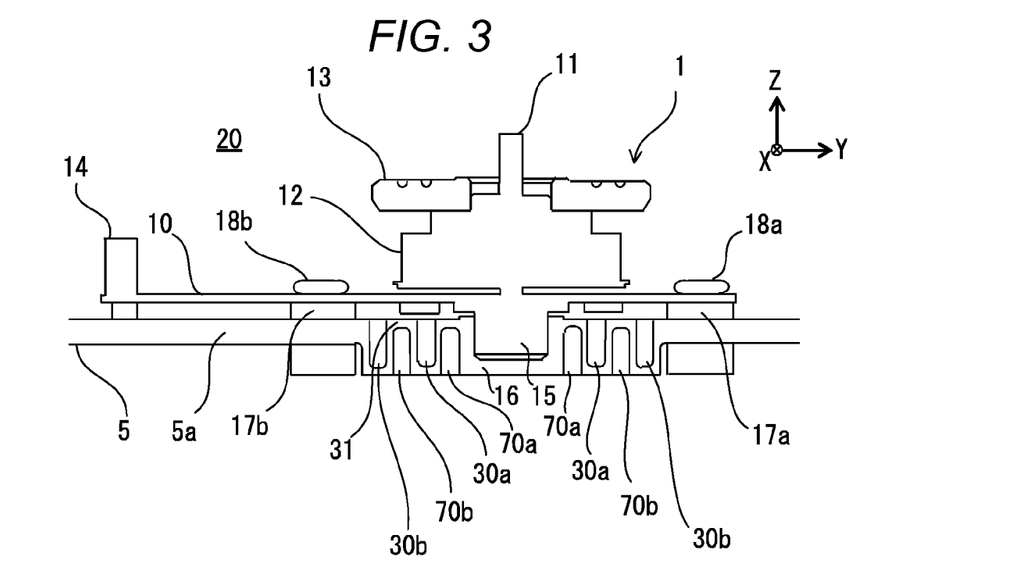
FIG. 3 is an enlarged sectional view for illustrating the vicinity of a light deflector of the light scanning apparatus according to the embodiment of the present invention.

FIG. 3 is an enlarged sectional view for illustrating the vicinity of the light deflector 1 of the light scanning apparatus 20.

The light scanning apparatus 20 includes at least one light source 6a, 6b, the light deflector 1, the optical members (lenses 2a, 2b, and 3a to 3d and mirrors 4a to 4h), and the housing 5. In the embodiment, the light scanning apparatus 20 includes the lenses 2a, 2b, and 3a to 3d and the mirrors 4a to 4h as the optical members, but the present invention is not limited thereto. The light scanning apparatus 20 does not necessarily need to include the mirrors, but may include only a lens as the optical member configured to guide the light beam deflected by the light deflector 1 onto the respective image bearing members 21.

The light deflector 1 includes a motor drive circuit board 10, a rotary shaft 11, a rotor 12, a stator (not shown), a mirror portion (polygon mirror) 13, and a bearing portion 15. The mirror portion 13 is fixed to the rotor 12. The rotor 12 is fixed to the rotary shaft 11. The rotary shaft 11 is rotatably supported by the bearing portion 15. The stator is fixed to the bearing portion 15. The motor drive circuit board (support member) 10 is fixed to the bearing portion 15, and supports the bearing portion 15. The rotor 12 and the stator constitute a motor. The motor drive circuit board 10 drives the stator to rotate the rotor 12. Electric power is supplied from a connector portion 14 to the motor drive circuit board 10, and the rotor 12 rotates about the rotary shaft 11. Through the rotation of the rotor 12, the mirror portion 13 rotates at constant speed to deflect the light beams emitted from the light sources 6a and 6b.

The housing 5 holds the light sources 6a and 6b and the light deflector 1. A bearing holding portion (a bearing inserting portion) 16 configured to hold the light deflector 1 by fitting onto the bearing portion 15 of the light deflector 1 (that is, by inserting the bearing portion 15 into the bearing holding portion 16) is provided in a bottom plate 5a of the housing 5. Further, a plurality of fixing portions 17 (17a, 17b, 17c, and 17d) configured to fix the motor drive circuit board 10 of the light deflector 1 are provided in the bottom plate 5a of the housing 5. The plurality of fixing portions 17 are arranged around the bearing holding portion 16 with intervals from the bearing holding portion 16. The bearing holding portion 16 and the plurality of fixing portions 17 are fixed to an inner surface of the bottom plate 5a of the housing 5. The bearing holding portion 16 and the plurality of fixing portions 17 may be formed integrally with the bottom plate 5a of the housing 5. Alternatively, the bearing holding portion 16 and the plurality of fixing portions 17 may be fixed to the bottom plate 5a of the housing 5 with a fixing member such as an adhesive.

The light deflector 1 is positioned with respect to the housing 5 by fitting the bearing portion 15 into the bearing holding portion 16 which are provided in the housing 5. Then, screws 18a, 18b, 18c (not shown), and 18d (not shown) are fastened to the fixing portions 17a, 17b, 17c (not shown), and 17d (not shown) provided in the housing 5, respectively, through holes provided in the motor drive circuit board 10. In this manner, the motor drive circuit board 10 is fixed to the housing 5.

The rotor 12 is provided immediately above the motor drive circuit board 10. The fixing portions 17a to 17d are arranged outside a radially outer portion (an outer diameter) of the rotor 12. With this arrangement, the light deflector 1 is mounted easily, and further, the light deflector 1 is stabilized against vibrations and external forces.

The housing 5 and the motor drive circuit board are made of different materials. For example, the housing 5 is made of a resin. For example, the motor drive circuit board 10 is made of iron.

When the light deflector 1 rotates, the bearing portion 15 generates the largest amount of heat, and the heat thus generated is transferred to the housing 5. Therefore, a thermal stress is generated in the housing 5 made of a resin and in the motor drive circuit board 10 made of iron and joined to the housing 5 by the fixing portions 17a to 17d. Thus, the thermal stress thus generated causes thermal deformation in the housing 5 and the motor drive circuit board 10, and as a result, the posture of the light deflector 1 becomes unstable.

Further, the thermal stress thus generated causes distortion in the entire housing 5, and as a result, the postures of the lenses and mirrors mounted on the housing 5 change as well. Thus, irradiation positions of the light beams on the image bearing members 21 are deviated, and color misregistration occurs in the images transferred onto the sheet, leading to image degradation.

In particular, in the case of the full-color image forming system as in the embodiment, in which the single light scanning apparatus 20 exposes the four image bearing members 21 to four light beams, the deviated irradiation positions of the light beams corresponding to the respective colors do not match with one another, and hence the color misregistration becomes more serious.

In order to solve the above-mentioned problem, as illustrated in FIG. 3, in the bottom plate 5a of the housing 5, the recessed portions 30a and 30b are provided in a region between the bearing holding portion 16 and the fixing portions 17a to 17d. The fixing portions 17a to 17d are provided at positions outside the radially outer portion of the rotor 12, and hence the recessed portions 30a and 30b are provided immediately below the motor drive circuit board 10. That is, the motor drive circuit board is arranged between the rotor 12 and the recessed portions 30a and 30b, and covers the recessed portions 30a and 30b.

Figure 4A:
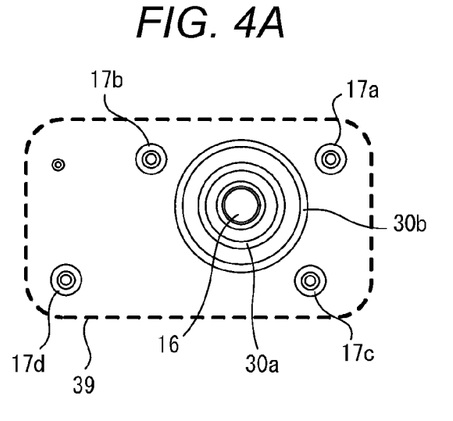
FIGS. 4A, 4B, 4C, and 4D are schematic views of a housing as seen from an axial direction of a rotary shaft (Z-direction of FIG. 3) of the light deflector according to the embodiment of the present invention.

FIG. 4A is a schematic view of the housing 5 as seen from an axial direction of the rotary shaft 11 (Z-direction of FIG. 3) of the light deflector 1. The axial direction of the rotary shaft 11 is a direction perpendicular to the bottom plate 5a of the housing 5.

As described above, the recessed portions 30a and 30b are provided immediately below the motor drive circuit board 10, and hence the recessed portions 30a and 30b are located inside a region 39 defined by projecting the motor drive circuit board 10 onto the housing 5 in the axial direction of the rotary shaft 11 of the light deflector 1. In the embodiment, the recessed portions 30a and 30b have a circular shape surrounding the bearing holding portion 16.

As described above, the thermal stress is generated in the housing 5 made of a resin and in the motor drive circuit board 10 made of iron, which are different in coefficient of linear expansion. However, in the embodiment, the recessed portions 30a and 30b are provided, and hence the generation of the thermal stress can be suppressed through deformation of opening portions of the recessed portions 30a and 30b.

Specifically, the generation of the thermal stress can be suppressed in the following manner. The heat generated in the bearing portion 15 is transferred along the recessed portions 30a and 30b, and the thermal deformation of the housing 5 occurs along the recessed portions 30a and 30b. The recessed portions 30a and 30b include a Z-direction component, and hence thermal deformation in the Z-direction occurs in the recessed portions 30a and 30b. The recessed portions 30a and 30b are not restricted in the Z-direction, and hence the recessed portions 30a and 30b freely expand in the Z-direction, resulting in no thermal stress. Even when the recessed portions 30a and 30b are provided, the amount of heat generated in the light deflector 1 does not change, that is, the total amount of thermal deformation does not change. Thus, the thermal deformation amount in a direction perpendicular to the Z-direction (direction in the X-Y plane of FIG. 3) decreases by an amount corresponding to the thermal deformation occurring in the Z-direction.

The coefficient of linear expansion of the housing 5 made of a resin is three to five times as large as the coefficient of linear expansion of the motor drive circuit board 10 made of iron, and hence the thermal deformation occurs more easily in the housing 5. However, the thermal deformation amount of the housing 5 in the direction perpendicular to the Z-direction decreases, and hence the difference in thermal deformation amount between the housing 5 and the motor drive circuit board 10 in the direction perpendicular to the Z-direction decreases in the region between the bearing holding portion 16 and the fixing portions 17a to 17d. Thus, the thermal stress generated due to the fact that the motor drive circuit board 10 is fixed to the housing 5 is suppressed, and as a result, the change in posture of the light deflector 1 can be suppressed.

According to the embodiment, even when the coefficient of linear expansion of the material forming the housing 5 of the light scanning apparatus 20 is different from the coefficient of linear expansion of the material forming the motor drive circuit board 10 of the light scanning apparatus 20, there is no need to add new components or change the materials for the members constituting the light scanning apparatus 20.

In the embodiment, a plurality of recessed portions 30a and 30b are provided, and an intermediate region 31 between the recessed portion 30a and the recessed portion 30b is deformed so as to freely expand. Accordingly, the generation of the thermal stress can be suppressed more effectively. However, the thermal stress can be suppressed even in a case of a single recessed portion.

Further, the thickness of a part, in which the recessed portions 30a and 30b are formed, of the bottom plate 5a of the housing 5 is set smaller than the thickness of a part of the bottom plate 5a other than the recessed portions 30a and 30b, and accordingly the thermal deformation can easily occur in the recessed portions 30a and 30b. Specifically, in order to reduce the thickness of the part, in which the recessed portions 30a and 30b are formed, of the bottom plate 5a of the housing 5, for example, recessed portions 70a and 70b of FIG. 3 are provided in the bottom plate 5a of the housing 5. When the thermal deformation in the X-Y direction occurs in the intermediate region 31, a thin wall portion between the recessed portion 30a and the recessed portion 70b and a thin wall portion between the recessed portion 30b and the recessed portion 70b can warp in the X-Y direction. The thermal deformation amount of the intermediate region 31 is absorbed by the warp of the thin wall portion between the recessed portions, and hence the thermal deformation amount of the bottom plate 5a of the housing 5 can be reduced.

Further, the recessed portions 30a and 30b are provided, and hence the area of contact of the housing 5 with the outside air increases so that the temperature rise can be suppressed in a part located outside the recessed portions 30a and 30b. Thus, the change in posture of the light deflector 1 can be suppressed.

Figure 5:
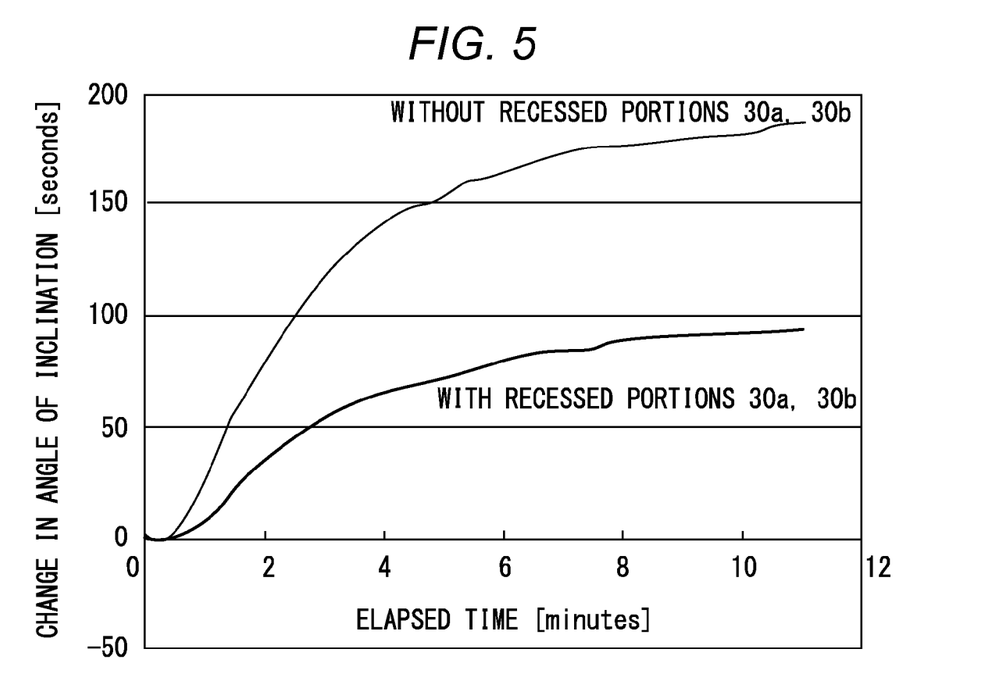
FIG. 5 is a graph showing a change in thermal deformation amount of a bottom plate of the housing relative to an elapsed time since activation of the light deflector according to the embodiment of the present invention.
Figure 6:
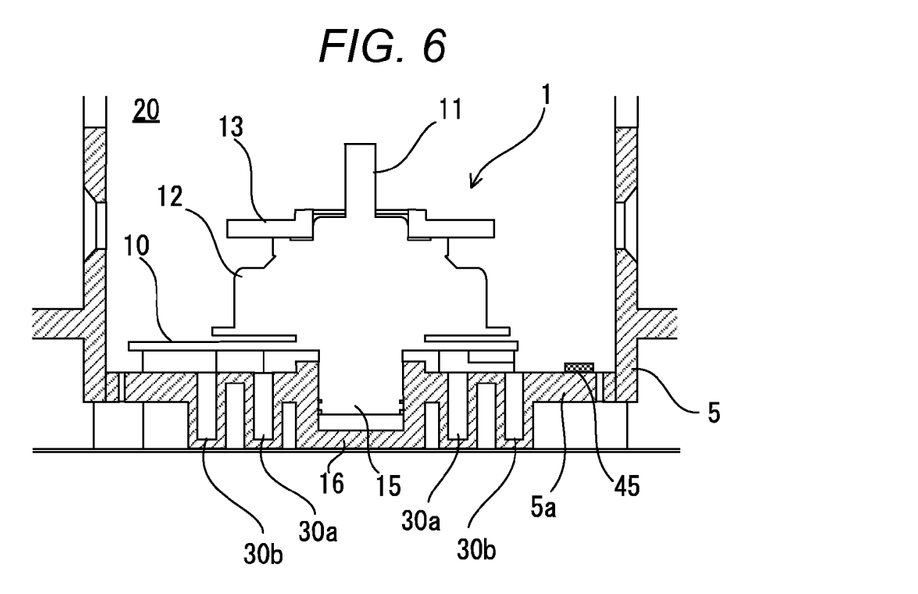
FIG. 6 is an enlarged sectional view for illustrating the vicinity of the light deflector of the light scanning apparatus according to the embodiment of the present invention.

FIG. 5 is a graph showing a change in thermal deformation amount of the bottom plate 5a of the housing 5 relative to an elapsed time since activation of the light deflector 1. FIG. 6 is an enlarged sectional view for illustrating the vicinity of the light deflector 1 of the light scanning apparatus 20. The thermal deformation amount shown in FIG. 5 is measured at a measurement point illustrated in FIG. 6. Further, as the thermal deformation amount, the amount of change in angle of inclination of the bottom plate 5a is measured, which significantly affects the change in posture of the light deflector 1.

Referring to FIG. 5, the following is found. After the elapse of 10 minutes, in the conventional case where the recessed portion 30a and 30b are not provided, the amount of change in angle of inclination of the bottom plate 5a along with the thermal deformation is about 180 seconds. On the other hand, in the case of the embodiment where the recessed portions 30a and 30b are provided, the amount of change in angle of inclination of the bottom plate 5a along with the thermal deformation is reduced to about 90 seconds.

Figure 4B:
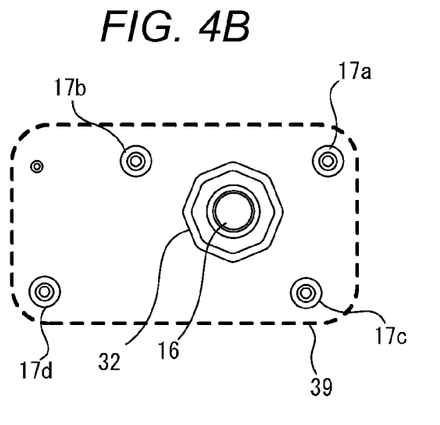
Figure 4C:
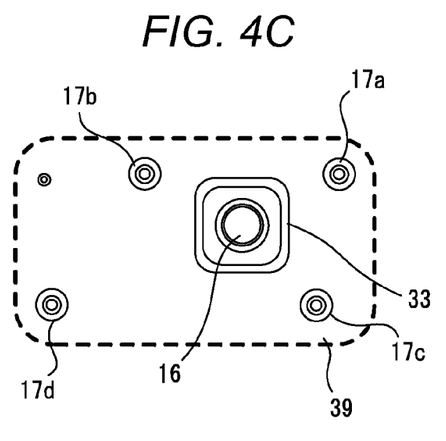

As described above, the shape of the recessed portions 30a and 30b according to the embodiment is a circular shape as illustrated in FIG. 4A as seen from the axial direction of the rotary shaft 11 (Z-direction of FIG. 3) of the light deflector 1. However, the present invention is not limited thereto, and the recessed portion may have a polygonal shape as long as the recessed portion is provided in the region between the bearing holding portion 16 and the fixing portions 17a to 17d. For example, a single recessed portion 32 having an octagonal shape as illustrated in FIG. 4B or a single recessed portion 33 having a rectangular shape as illustrated in FIG. 4C may be conceivable.

Figure 4D:
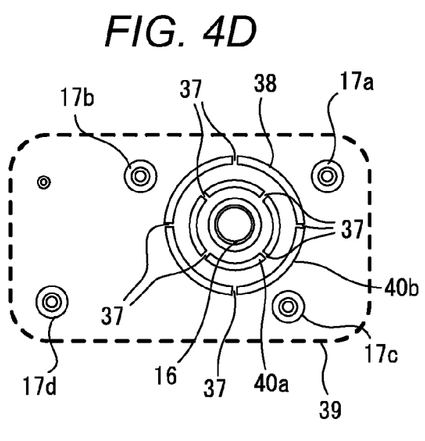

Further, the recessed portion does not need to have a continuous shape, and recessed portions 40a and 40b as illustrated in FIG. 4D may be employed. The recessed portions 40a and 40b have an intermittent shape in which a plurality of recessed portion segments 38 are connected to one another through an intermediation of a plurality of connecting portions 37 for a vibration proofing purpose. In this case, in order to suppress the generation of the thermal stress between the bearing holding portion 16 and the fixing portions 17a to 17d, it is desired that the connecting portions 37 avoid being located on a straight line connecting the center of the bearing holding portion 16 and the center of the fixing portion 17a, 17b, 17c, or 17d. Further, it is desired that a straight line connecting the center of the bearing holding portion 16 and each connecting portion 37 of the recessed portion 40a avoid matching with a straight line connecting the center of the bearing holding portion 16 and each connecting portion 37 of the recessed portion 40b.

The recessed portions 30a and 30b according to the embodiment are provided inside the region 39 defined by projecting the motor drive circuit board 10 onto the bottom plate 5a. However, a part of the recessed portion may be provided outside the projection region 39.

That is, the recessed portion only needs to be provided in a part of the bottom plate 5a between the bearing holding portion 16 and the fixing portions 17a to 17d of the housing 5. With this configuration, the effect of suppressing the generation of the thermal stress can be obtained.

A cross-sectional shape of the recessed portions 30a and 30b according to the embodiment, which is taken in a plane including the axis of the rotary shaft 11 of the light deflector 1 (for example, Y-Z plane of FIG. 3), is a rectangular wave shape as illustrated in FIG. 3. The plane including the axis of the rotary shaft 11 is a plane perpendicular to the bottom plate 5a of the housing 5.

Figure 7A:
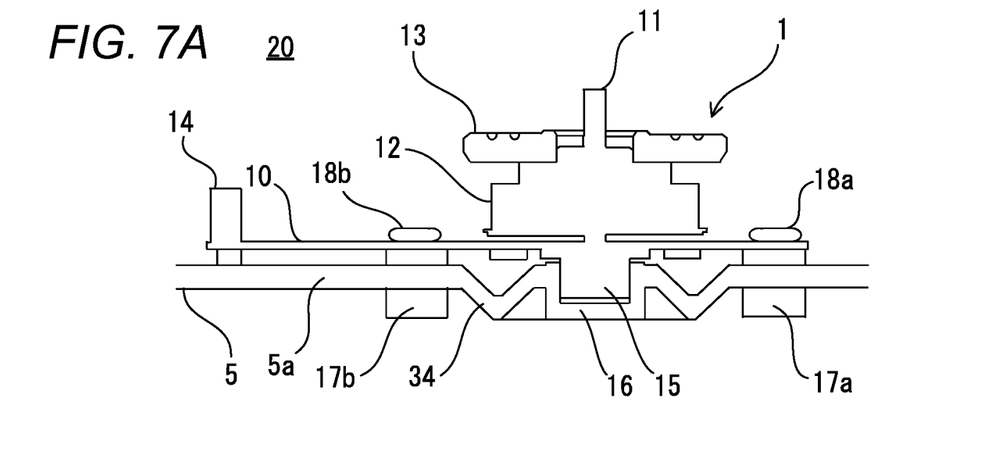
FIGS. 7A, 7B, and 7C are enlarged sectional views for illustrating the vicinity of the light deflector of the light scanning apparatus according to the embodiment of the present invention.
Figure 7B:
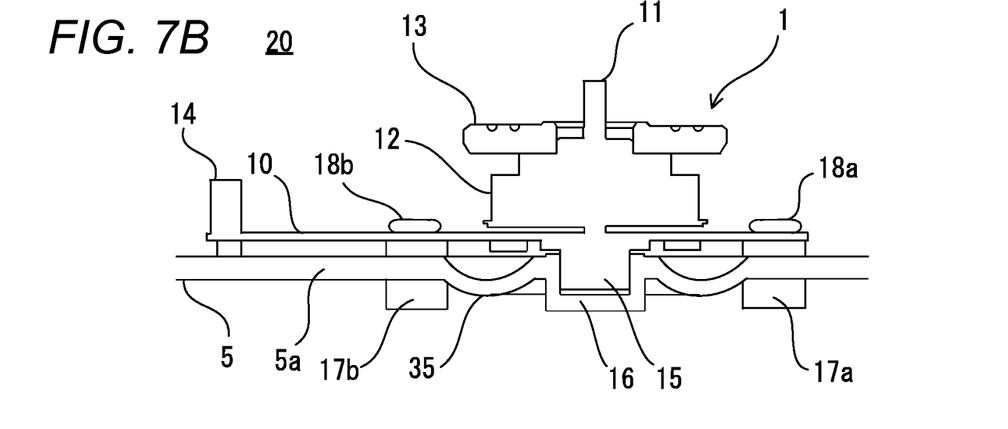
Figure 7C:
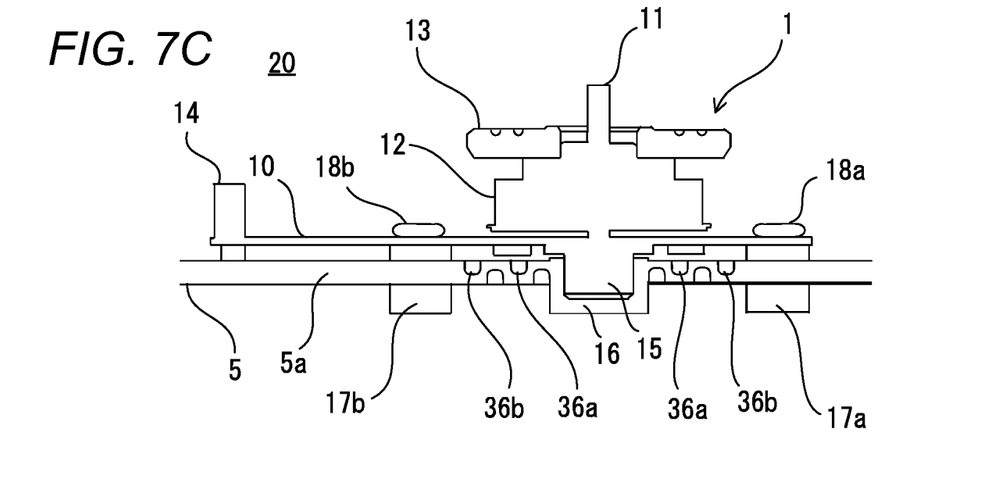

However, the present invention is not limited thereto. For example, a recessed portion 34 having a triangular wave shape as illustrated in FIG. 7A or a recessed portion 35 having a shape with a curvature as illustrated in FIG. 7B may be employed. Further, the recessed portion does not need to have a sufficient depth, and when the sufficient space for providing the recessed portion cannot be ensured due to a restriction in arrangement, as illustrated in FIG. 7C, recessed portions 36a and 36b may be provided in the bottom plate 5a of the housing 5.

That is, it is only necessary that the recessed portion located in the region between the bearing holding portion 16 and the fixing portions 17a to 17d which are provided in the housing 5 include the Z-direction component. With this configuration, the effect of suppressing the generation of the thermal stress can be obtained.

In the image forming apparatus 100 according to the embodiment, the four image bearing members 21 for forming a full-color image are arranged, and the light scanning apparatus 20 is provided below the image forming portion 50 including the four image bearing members 21. However, the present invention is not limited to this configuration. The light scanning apparatus may be provided above the image forming portion, and the present invention is also applicable to an image forming apparatus including a single image bearing member arranged in the image forming portion to form, for example, a black monochrome image.

With the above-mentioned configuration, the generation of the thermal stress in the housing 5 and in the motor drive circuit board 10 can be suppressed in the region between the bearing holding portion 16 and the fixing portions 17a to 17d.

Thus, according to the embodiment, the recessed portion is provided in the region between the bearing holding portion 16 and the fixing portions 17a to 17d which are provided in the bottom plate 5a of the housing 5, and hence the generation of the thermal stress in the housing 5 and in the motor drive circuit board 10 is suppressed. Accordingly, the postures of the optical members mounted on the housing 5 of the light scanning apparatus 20, such as the lenses 2a, 2b, and 3a to 3d, the mirrors 4a to 4h, and the light deflector 1, are stabilized, and thus the image degradation along with the color misregistration occurring in the image formation can be prevented.

According to the embodiment, even when the coefficient of linear expansion of the material forming the housing of the light scanning apparatus is different from the coefficient of linear expansion of the material forming the drive circuit board of the light scanning apparatus, the recessed portion is provided in the region between the bearing holding portion and the fixing portion which are provided in the bottom plate of the housing, and hence the thermal stress generated in the housing and in the drive circuit board can be suppressed. Accordingly, the postures of the light deflector and the optical members are stabilized, and thus the image degradation along with the color misregistration occurring in the image formed on the sheet can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-282608, filed Dec. 26, 2011, which is hereby incorporated by reference herein in its entirety.

What is claimed is:

1. A light scanning apparatus, comprising:
a light source configured to emit a light beam;
a light deflector; and
a housing;
wherein the light deflector comprises:
a rotary shaft;
a bearing portion configured to support the rotary shaft;
a rotor fixed to the rotary shaft;
a stator fixed to the bearing portion;
a drive circuit board configured to support the bearing portion and to drive the stator to rotate the rotor; and
a mirror portion fixed to the rotor, the light deflector being configured to deflect the light beam emitted from the light source by the mirror portion; and
wherein the housing comprises:
a bearing inserting portion into which the bearing portion is inserted;
a fixing portion configured to fix the drive circuit board to the housing; and
first and second recessed portions defining a thin wall therebetween, the thin wall being provided between the bearing inserting portion and the fixing portion, and the thin wall surrounding the bearing inserting portion, as seen from a direction perpendicular to a bottom plate of the housing,
wherein the first and second recessed portions extend from mutually opposite directions from the bottom plate of the housing.

2. A light scanning apparatus according to claim 1, wherein the fixing portion is provided at a position outside a radially outer portion of the rotor of the light deflector.

3. A light scanning apparatus according to claim 1, wherein a thickness of a part, in which the thin wall is formed, of a bottom plate of the housing is smaller than a thickness of a part other than the part in which the thin wall is formed, of the bottom plate of the housing.

4. A light scanning apparatus according to claim 1, wherein the thin wall has a circular shape surrounding the bearing inserting portion as seen from a direction perpendicular to the bottom plate of the housing.

5. A light scanning apparatus according to claim 1, wherein the thin wall has a polygonal shape surrounding the bearing inserting portion as seen from the direction perpendicular to the bottom plate of the housing.

6. A light scanning apparatus according to claim 1, wherein a sectional shape of the first and second recessed portions and the thin wall, which is taken in a plane perpendicular to the bottom plate of the housing, is a rectangular wave shape.

7. A light scanning apparatus according to claim 1, wherein a cross-sectional shape of the first and second recessed portions and the thin wall, which is taken in a plane perpendicular to the bottom plate of the housing, is a triangular wave shape.

8. A light scanning apparatus according to claim 1, wherein a cross-sectional shape of the first and second recessed portions and the thin wall, which is taken in a plane perpendicular to the bottom plate of the housing, is a shape having a curvature.

9. A light scanning apparatus according to claim 1, wherein the thin wall is provided inside a region defined by projecting the drive circuit board onto the bottom plate of the housing.

10. A light scanning apparatus according to claim 1, wherein the housing and the drive circuit board are made of different materials.

11. A light scanning apparatus according to claim 1, wherein the housing is made of a resin, and the drive circuit board is made of iron.

12. A light scanning apparatus according to claim 1, wherein the housing further comprises a third recessed portion defining a second thin wall between the third recessed portion and the first or second recessed portion, the second thin wall being provided between the bearing inserting portion and the fixing portion, and the second thin wall surrounding the bearing inserting portion as seen from the direction perpendicular to the bottom plate of the housing.

13. A light scanning apparatus according to claim 1, wherein the housing comprises successive recesses and thin walls configured to surround the bearing inserting portion.

14. A light scanning apparatus according to claim 13, wherein each successive thin wall has a circular shape surrounding the bearing inserting portion as seen from the direction perpendicular to the bottom plate of the housing.

15. A light scanning apparatus according to claim 13, wherein each successive thin wall has a circular shape surrounding a preceding thin wall as seen from the direction perpendicular to the bottom plate of the housing.

16. A light scanning apparatus according to claim 1, wherein the first and second recessed portions and the thin wall are constructed to absorb thermal deformation in a direction aligned along the bottom plate of the housing.

17. A light scanning apparatus according to claim 16, wherein thermal deformation is absorbed by warping of the first and second recessed portions and the thin wall.

* * * * *